No. 719,274. PATENTED JAN. 27, 1903.
Z. B. STUART.
PROCESS OF EXTRACTING METALS FROM ORES.
APPLICATION FILED MAR. 31, 1902.
NO MODEL.
Fig. I.
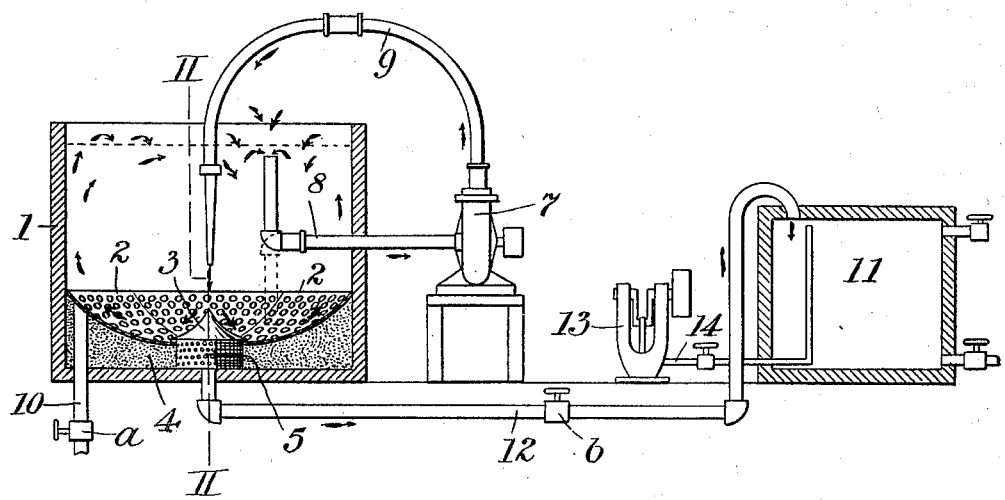
Fig. II.
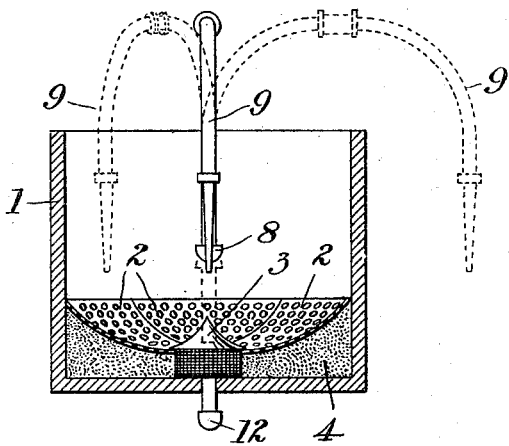
Fig. III.
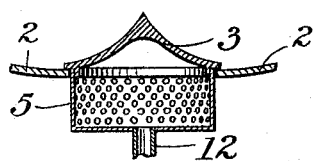
Witnesses:
G. T. Hackley
E. A. Waterman
Inventor:
Zebulon B. Stuart.
by Townsend Bros
his Attys.

UNITED STATES PATENT OFFICE.

ZEBULON B. STUART, OF LOS ANGELES, CALIFORNIA.

PROCESS OF EXTRACTING METALS FROM ORES.

SPECIFICATION forming part of Letters Patent No. 719,274, dated January 27, 1903.

Application filed March 31, 1902. Serial No. 100,822. (No specimens.)

*To all whom it may concern:*

Be it known that I, ZEBULON B. STUART, a citizen of the United States, residing at Los Angeles, in the county of Los Angeles and State of California, have invented new and useful Improvements in Processes of Extracting Metals from Ore, of which the following is a specification.

My invention relates to the process of extracting gold and other precious metals by means of the dissolving action of cyanid, and has for its object to render the process considerably more expeditious, effectual, and cheaper.

By my process the entire mass of pulp, cyanid, and water are agitated together and the mixture brought to a state of ebullition, air being sucked in to thoroughly permeate the mixture and further the boiling effect and agitation, while performing the necessary oxidation. I also subject the mixture to an additional mechanical agitation in which air is further mingled with the mixture. This method of agitation causes a complete suspension of the solids, and the resulting liquid state of the mixture is substantially of the same consistency throughout, thus causing the entire amount of pulp to be equally subjected to the action of the dissolving agent. As the entire pulp is so thoroughly distributed and the oxidation so effective, the resulting action of the cyanid is very energetic, dissolving the metal very rapidly, so that a less amount of cyanid is required than heretofore.

The process is so effective and rapid that when treating good cyaniding ore the values may be extracted in from three to six hours.

The accompanying drawings illustrate an apparatus which may be used to carry out my process.

Figure I is a side elevation, partly in section, of the complete apparatus. Fig. II is a section on line II II, Fig. I. Fig. III is a detail.

1 is a tank having an open top. The tank has a concave bottom, formed of perforated plates 2, which may be of iron or steel. Projecting upwardly from the center of the bottom is a conical plate 3. I have provided a filter underneath the plates 2, which is composed of coarse gravel 4 and a perforated box 5. I prefer to cover the box 5 with a layer of coarse burlaps 6.

7 is a centrifugal pump.

8 is a suction-pipe, and 9 is a discharge-pipe. The pipes 8 and 9 are provided with joints, allowing them various adjustments.

10 is a discharge-pipe for the tank 1.

*a* is a valve for the pipe 10.

11 is a vacuum-tank.

12 is a pipe connecting the box 5 with the vacuum-tank 11.

*b* is a valve for the pipe 12.

13 is a pump connected to the vacuum-tank by a pipe 14.

When treating copper ores, all metallic parts which come in contact with the ore I preferably provide with a lead coating or construct of lead.

The crushed ore or pulp is placed in the tank 1. The cyanid and water are then added, which fills the tank to about the dotted line. Valves *a* and *b* being closed, the pump 7 is started and the liquid is drawn through the pipe 8 to the pump 7 and back to the tank 1 through the pipe 9. The pipe 8 extends nearly to the upper surface of the liquid, so that as the process proceeds not only liquid, but considerable air, is drawn in as the liquid is sucked into the pipe. The pipe 9 discharges near the apex of the conical plate 3, and the issuing mixture is deflected by the plate 3 and then rises to the top. Continued action of the pump 7 causes the entire contents of the tank 1 to be stirred up and thoroughly agitated, making the mixture of equal consistency throughout, and brought to a state of ebullition. Air enters through the top of the tank and mingles with the boiling mixture, and air is also sucked into the pipe 8 and is intimately intermixed with the mixture in the pump 7. The mixture is repeatedly drawn from the tank 1, agitated and further oxidized in the pump 7, and then returned to the tank 1. As the mixture is constantly being drawn from the top of the tank 1, fresh mixture is forced to the top, where it is exposed to the action of air. In addition to this, considerable air is sucked in around the outside of the pipe 8, which does not enter the pipe directly, but mingles with the mixture in tank 1. This effect is produced by the suction of the inrushing mixture, as indicated by the arrows. As the mixture is sucked into the pipe 8 it draws with it a quantity of air directly into the pipe, which passes with the mixture into the pump 7, and there the mixture is violently agitated and mechanically stirred, which effectually brings the cyanid into intimate contact with the air and pulp, so that oxidation and agitation are performed in the pump as well as in the tank 1. The mixture thus produced is then returned through the pipe 8 to the lower part of the mixture in the tank 1, through which the air contained in the issuing mixture rises, thereby coming into contact with the particles thereof and also assisting in keeping the contents of the tank lively. The boiling action causes a thorough distribution of the cyanid, which, with the oxidation, dissolves the gold rapidly. After a sufficient time the pump 7 is stopped, valve $b$ opened, and pump 13 started, which draws the solution into the tank 11 after it has passed through the filter in tank 1. The solution may pass from the tank 11 to suitable zinc boxes. (Not shown.) After the solution has been drawn from the tank 1 the remaining pulp settles upon the plates 2. By putting water in the tank 1 and starting the pump 7 the pulp may again be put in solution and either drawn off through pipe 10, or by arranging the pipes 8 and 9 as shown by dotted lines in Fig. II the solution may be pumped out of the tank 1 and discharged through the pipe 9.

The plates 2 may be lifted out of the tank 1 to allow removal of the gravel 4 for cleaning.

The apparatus which I have briefly described is made the subject-matter of another application of mine executed March 25, 1902, Serial No. 100,821.

What I claim, and desire to secure by Letters Patent of the United States, is—

1. The process of extracting precious metal from ore, consisting in submitting the ore to the action of cyanid and water and simultaneously agitating the mixture and causing the entire solids to be held in suspension, and mingling air therewith in one vessel and then further agitating the mixture in another vessel.

2. The process of extracting precious metal from ore, consisting in subjecting the ore to the dissolving action of cyanid and water, and at the same time thoroughly mixing and agitating the ore, cyanid, and water, and mingling air therewith in one receptacle, thereby putting the ore and cyanid in complete suspension and forming a mixture of substantially equal consistency throughout and then further agitating the mixture in another receptacle.

3. The process of extracting precious metal from ore, consisting in subjecting the ore to the dissolving action of cyanid and water, and thoroughly mixing and agitating the ore, cyanid, and water, and mingling air therewith in one receptacle, putting the ore and cyanid in complete suspension and making a mixture of substantially equal consistency throughout and then further agitating the mixture in another receptacle, thus reducing the mixture to substantially a fluid state, then filtering the same.

4. The process of extracting precious metal from ore, consisting in subjecting the ore to the dissolving action of cyanid, water, and air in one receptacle and putting the entire mass into suspension and simultaneously passing the resulting mixture with a further quantity of air to another receptacle and further agitating the mixture in that receptacle and then returning the mixture to the first receptacle.

5. The process of extracting precious metal from ore, consisting in subjecting the ore to the dissolving action of cyanid, water and air in one receptacle and causing the entire mixture to be agitated and mixed therein by ebullition, then passing a relatively smaller amount of the mixture of ore, cyanid, water, and air to another receptacle and combining therewith a relatively larger proportion of air, and subjecting such mixture to a mechanical agitation.

6. The process of extracting precious metal from ore, consisting in agitating the pulp together with, cyanid, water, and air by ebullition in one vessel causing the mixture to assume an even consistency throughout and passing the mixture through a mechanical agitator and combining therein a relatively smaller quantity of mixture with a relatively larger quantity of air and there forcing the pulp, cyanid, water and air into intimate contact, and circulating the mixture through the two vessels.

In testimony whereof I have signed my name to this specification, in the presence of two subscribing witnesses, at Los Angeles, California, this 25th day of March, 1902.

ZEBULON B. STUART.

Witnesses:
G. T. HACKLEY,
JAMES R. TOWNSEND.